United States Patent [19]
Lary et al.

[11] Patent Number: 5,657,471
[45] Date of Patent: Aug. 12, 1997

[54] DUAL ADDRESSING ARRANGEMENT FOR A COMMUNICATIONS INTERFACE ARCHITECTURE

[75] Inventors: Richard Lary, Colorado Springs, Colo.; Robert Willard, Andover, Mass.; Catharine van Ingen, Shrewsbury, Mass.; David Thiel, Colorado Springs, Colo.; William Watson, Redmond, Wash.; Barry Rubinson, Danville, Calif.; Verell Boaen, Groton, Mass.

[73] Assignee: Digital Equipment Corporation, Maynard, Mass.

[21] Appl. No.: 870,491

[22] Filed: Apr. 16, 1992

[51] Int. Cl.$^6$ .................................................. G06F 13/10
[52] U.S. Cl. ................... 395/481; 395/413; 395/681
[58] Field of Search ............................. 395/200, 400, 395/425, 600, 681, 874, 413, 481

[56] References Cited

U.S. PATENT DOCUMENTS

| | | | |
|---|---|---|---|
| 3,487,375 | 12/1969 | Macon et al. | 340/172.5 |
| 4,035,777 | 7/1977 | Moreton | 364/309 |
| 4,387,427 | 6/1983 | Cox et al. | 364/672 |
| 4,419,728 | 12/1983 | Larson | 364/309 |
| 4,449,182 | 5/1984 | Rubinson et al. | 395/250 |
| 4,777,595 | 10/1988 | Strecker et al. | 364/200.17 |
| 4,829,425 | 5/1989 | Bain, Jr. et al. | 364/800 |
| 4,897,786 | 1/1990 | Pimm et al. | 364/288 |
| 4,939,636 | 7/1990 | Nakagawa et al. | 364/474 |
| 4,956,771 | 9/1990 | Neustaedter | 364/872 |
| 4,958,277 | 9/1990 | Hill et al. | 364/872 |
| 4,975,829 | 12/1990 | Clarey et al. | 364/500 |
| 5,220,653 | 6/1993 | Miro | 395/627 |
| 5,239,634 | 8/1993 | Buch et al. | 395/410 |

OTHER PUBLICATIONS

Collier et al., "Queued Communication Interface"; IBM Technical Disclosure Bulletin vol. 19, No. 1, Jun. 1976, New York US pp. 217-221.

Publication, "CSR Architecture (DMA Processors), and Optional Framework for DMA-Processors Architectures" Draft 1.0 by P1212 Working Group of the Microprocessor Standards Committee, Standards Subcommittee of the Technical Committee on Microprocessors and Microcomputers of the IEEE Computer Society, Jan. 31, 1990 at pp. 4-12.

*Primary Examiner*—Eddie P. Chan
*Assistant Examiner*—Kevin L. Ellis
*Attorney, Agent, or Firm*—Anne E. Saturnelli; David A. Dagg; Arthur W. Fisher

[57] ABSTRACT

A dual addressing arrangement comprises a complex address pointer within entries of a communication queue used by a port driver and an port adapter when exchanging information in a host computer. The complex address pointer comprises a virtual address portion and a physical address portion. The port driver uses the virtual address portion to ascertain the location of entry structures, while the port adapter uses the physical address portion to locate the structures in a host memory. The arrangement and interpretation of the address portions of the complex pointers within an entry depend upon the direction of information flow, i.e., the passing of messages from the port driver to the port adapter using a driver-to adapter queue or the passing of responses from the adapter to the driver using an adapter-to-driver queue.

7 Claims, 8 Drawing Sheets

DUAL ADDRESSING ARRANGEMENT FOR A COMMUNICATIONS INTERFACE ARCHITECTURE

FIELD OF THE INVENTION

This invention relates generally to addressing within a host computer and, more specifically, to addressing of a communication interface between a software port driver and a hardware port adapter.

BACKGROUND OF THE INVENTION

A data processing system typically comprises a host computer connected to one or more nodes, e.g., other host computers or peripheral devices, via an interconnect medium. The host computer comprises a number of basic elements including a central processing unit (CPU), a host memory and an input/output (I/O) port adapter that physically connects the computer to the interconnect medium. In general, the interconnect medium is a network or I/O bus, and the peripheral devices are typically disks, tapes and communications equipment.

The computer is functionally organized by an operating system comprising a collection of software modules that control the execution of computer programs and manage the transfer of information among the elements of the computer. The host memory stores computer program information, i.e., data and instructions, in addressable storage locations. The CPU then executes the programs by fetching and interpreting the instructions, and processing the data in accordance with the instructions.

Program-generated addresses are called virtual addresses because they refer to the contiguous logical, i.e., virtual, address space referenced by a computer program. In contrast, the physical address space consists of the actual locations where information is stored in host memory. A host computer with a "virtual" memory allows programs to address more memory than is physically available. In addition, an advantage of virtual addressing is that the addresses of the program appear contiguous even though they may reference non-contiguous physical locations in host memory. This facilitates dynamic allocation of additional addresses, as needed.

The operating system manages the virtual memory so that the program operates as if it is loaded into contiguous physical locations. A common process for managing virtual memory is to divide the program and host memory into equal-sized blocks or pages so that each program page fits into a memory page. A system disk participates in the implementation of virtual memory by storing pages of the program not currently in host memory. The loading of pages from the disk to host memory is managed by the operating system.

When a program references an address in virtual memory, the CPU calculates the corresponding host memory physical address in order to access the information (hereinafter referred to generally as data). The CPU typically includes memory management hardware to hasten the translation of the virtual address to a physical address. Specifically, for each program there is a page table containing a list of mapping entries, i.e., page table entries (PTEs), which, in turn, contain the physical address of each page of the program and a valid bit denoting whether the PTE is valid. Each PTE thus indicates whether the program page is in host memory. If not, the PTE typically specifies where to find a copy of the page on the disk. The CPU performs this virtual-to-physical address translation via specialized hardware which is not generally accessed by software.

The operating system includes at least one port driver that controls at least one I/O port adapter when performing I/O operations, such as the transfer of data between the host computer and a node. In order to efficiently perform these operations, the port driver and port adapter exchange messages, e.g., commands and responses. Specifically, the driver sends a command to the port adapter to perform an operation. The port adapter interprets the command and forwards it to the appropriate node of the medium. The port adapter then returns a response to the driver.

Typically, the commands and responses are exchanged via linked queues, which are locations in host memory organized to provide data structures. A linked queue and its associated entries are assigned virtual addresses within the virtual address space of a program. This is convenient for the port driver because the CPU performs virtual address translations within its normal program execution. However, the port adapter may be required to perform similar translations in order to locate entries in the queue in host memory. This forces the adapter to participate in the memory management process by frequently accessing host memory to reference the program page table, resulting in an increase in the time required to process a message received from the port driver. Alternately, the driver, as executed by the CPU, may translate the virtual addresses to physical addresses for the port adapter. Yet, such frequent address translation activity creates additional overhead and complexity for the driver because it does not directly access the specialized CPU translation hardware; instead, the driver must perform a more laborious software procedure. Furthermore, when processing messages received from the port adapter, the driver must translate physical addresses back to virtual addresses. This latter procedure is an extremely difficult process involving searching all PTEs for a matching physical address.

To reduce the overhead burdens, the port adapter may maintain a small, high-speed memory, i.e., a translation buffer (TB), that stores virtual address translations of recently accessed queue entries. Yet, the entries of a linked queue or other communication data structure tend to be scattered throughout virtual address space. As a result, references to the TB frequently miss, i.e., the translations of requested virtual addresses are not contained within the TB. As before, the port adapter must directly access the page table to translate the virtual addresses.

Therefore, it is among the objects of the invention to provide a communication interface between entities, such as a port driver and an port adapter, of a computer that allows independent addressing of the interface by the entities.

Another object of the invention is to provide a dual addressing arrangement for a communication queue that eliminates the need for one entity to repeatedly translate addresses for the other entity.

Yet another object of the present invention is to provide a dual addressing arrangement for a communication queue that reduces the number of accesses to host memory by the port adapter in order to locate addressing information.

SUMMARY OF THE INVENTION

Briefly, the invention provides a dual addressing arrangement comprising a complex address pointer contained within entries of a communication queue located in a host memory of a computer to facilitate access to other queue entries when exchanging information between a port driver and an port adapter. The complex address pointer, in turn, comprises a virtual address portion and a physical address portion. Specifically, the port driver uses the virtual address portion of the complex pointer to ascertain the location of the entries, while the port adapter uses the physical address portion to locate the entries in host memory. The arrangement and interpretation of the address portions of the complex pointers within each entry depends upon the direction of information flow, i.e., the passing of messages between the port driver and port adapter using a driver-to-adapter (D-A) queue or the passing of responses between the adapter and driver using an adapter-to-driver (A-D) queue. For example, the portions of the complex pointers presented to the port adapter by the port driver when passing messages on the D-A queue are physical addresses in host memory.

The communication queue is a singly-linked queue comprising a header element and a stopper entry, with message entries linked therebetween. A message entry typically includes a carrier and a queue buffer, each of which is addressed virtually by the driver and physically by the port adapter. Specifically, each carrier contains a first complex pointer including addresses that point to the queue buffer, i.e., QBUF_PTR and QBUF_TOKEN. Each carrier also contains portions of two second complex pointers, i.e., NEXT_PTR and CURRENT_TOKEN. As described further herein, the NEXT_PTR includes an address pointing to the next entry in the queue and the CURRENT_TOKEN includes an address pointing to itself. The token (_TOKEN) portions of the pointers may be virtual addresses that are initialized by the driver when the carrier entry is allocated; the driver then translates them to the physical addresses (_PTR). Thereafter, the complex pointers are stored in the carrier for use by the port adapter. The queue buffer contains message/response specific control information.

To illustrate, the NEXT_PTR of a message carrier entry on the D-A queue is a physical address. The port adapter "removes" the entry from the queue and uses it to locate the next entry in host memory. Similarly, the QBUF_PTR of the message carrier is a physical address used by the port adapter to locate a message in a queue buffer in host memory. The CURRENT_TOKEN and the QBUF_TOKEN portions of the complex pointers of the message carrier are virtual addresses used by the port adapter to provide virtual address pointers to an entry and to an associated queue buffer for use by the driver. Therefore, the NEXT_PTR of a response carrier inserted by the adapter on the A-D queue is a virtual address for use by the port driver to locate a next response entry in the driver's virtual address space. Similarly, the QBUF_PTR of the response carrier on the A-D queue is a virtual address for the driver to identify the queue buffer location.

An advantage of the dual addressing technique of the invention is that the port adapter may independently access entries in a queue without performing virtual-to-physical address translations. Moreover, there is no dependency by the port adapter on the actual format of a virtual address. In addition, the invention described herein enables adapter migration to a host with a different virtual address space without any address translation complications on the part of the adapter. Since the port driver is responsible for the virtual address translations during allocation of the entries in a queue, the port adapter requires no knowledge of the system page table organization and has no reason to access the system page table in host memory.

Therefore, in accordance with the invention as embodied and broadly described herein, a dual addressing arrangement is provided for locating entries of a singly-linked queue in a host memory of a computer. The singly-linked queue is configured to pass information between a port driver operating system program executed by a CPU and an port adapter. The arrangement of the invention comprises: queue buffer means for storing the information for passing between the port adapter and driver; carrier means for storing first and second complex address pointers, the first complex address pointer configured to point to the queue buffer means and further comprising (i) a virtual address portion for use by the port driver to ascertain the location of the queue buffer means in host memory and (ii) a physical address portion for use by the port adapter to ascertain the location of the queue buffer means in host memory; the second complex address pointer configured to point to the next entry in the queue and the carrier means of the next entry, the second complex address pointer comprising (i) a virtual address portion for use by the port driver to ascertain the location of the next entry in host memory and (ii) a physical address portion for use by the port adapter to ascertain the location of the next entry in host memory. In accordance with the invention, the virtual address portion and the physical address portion of the complex pointers have a first arrangement for passing information in a first direction from the port driver to the port adapter via the singly-linked queue and have a second arrangement for passing information in a second direction from the port adapter to the port driver via the singly-linked queue.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
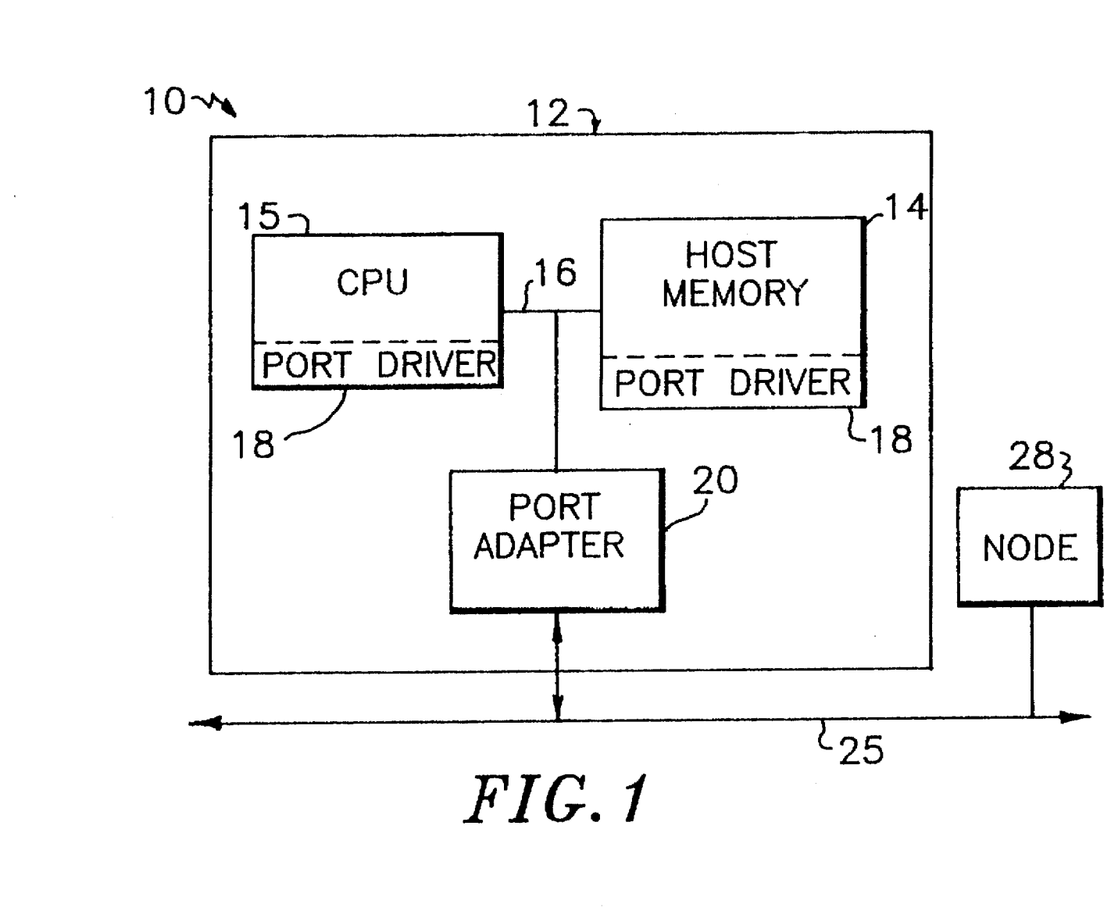
FIG. 1 is a diagram of a data processing system including a node connected to a host computer having an I/O port adapter, a CPU and a memory for storing at least portions of a port driver operating system program that is executed by the CPU.

Referring to FIG. 1, a data processing system 10 includes a host computer 12 connected to at least one node 28 via an interconnect medium 25. Node 28 may be another host computer or a peripheral device, such as a disk drive, whereas the interconnect medium 25 is typically a network or an input/output (I/O) bus. The host computer 12 may comprise a central processing unit (CPU) 15, a host memory 14 and an I/O port adapter 20 interconnected by a system bus 16. The host memory 14 may comprise storage locations typically composed of random access memory (RAM) devices, which are addressable by the CPU and port adapter. An operating system, portions of which are typically resident in memory 14 and executed by CPU 15, functionally organizes the computer 12. The operating system includes, inter alia, a port driver 18 executed by the CPU 15 to control the port adapter 20. The driver 18 is responsible for invoking I/O operations in support of programs executing in the CPU 15. The driver 18 and port adapter 20 communicate by "reading" and "writing" various data structures resident in the host memory 14. It is to be understood that the CPU 15 performs the actual read and write operations on behalf of the driver, whereas the port adapter 20 incorporates the necessary "intelligence" to perform similar operations itself.

If, for any reason, the host computer 12 desires to communicate with the node 28, the port driver software issues an appropriate message, e.g., a command, to the port adapter 20. The port adapter 20 interprets the message received from the driver 18, executes it by, for example, forwarding it to the appropriate node on the medium 25, and then responds to the port driver 18, if necessary. Later, the port adapter 20 may receive a message from node 28 specifying, for instance, data requested by the host computer 12. Because the message contains information necessary to locate a data buffer in host memory 14, the port adapter 20 transfers the data to the appropriate buffer location and notifies the port driver 18. The port adapter 20 may also receive unsolicited message packets from other nodes connected to the interconnect medium 25. The port adapter 20 may treat the incoming packets as messages to itself or pass them to the driver.

Figure 2:
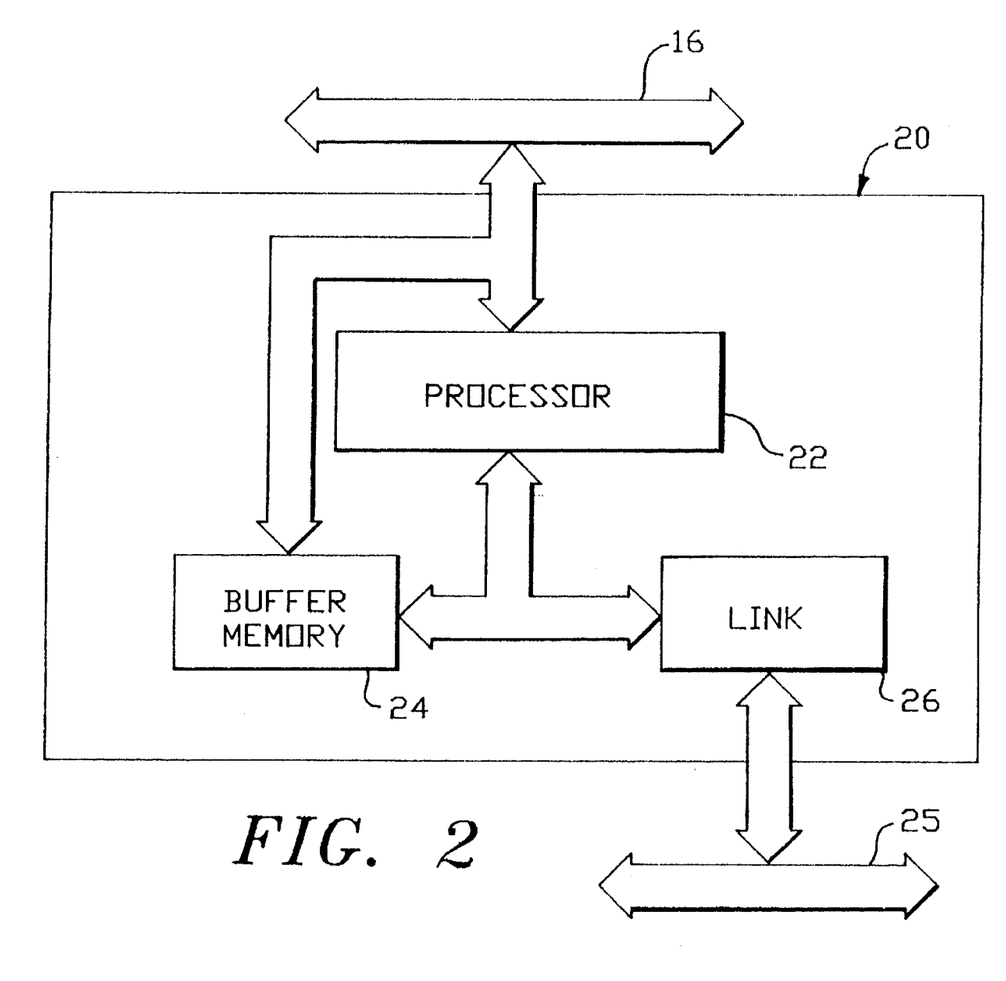
FIG. 2 is a diagram of the I/O port adapter of FIG. 1.

As shown in FIG. 2, the port adapter 20 may include a processor 22, a buffer memory 24 and a link 26. The processor 22 performs read and write operations in data structures in the host memory 14 (FIG. 1) that are used to exchange information with the driver 18. Accordingly, to perform its operations, the processor 22 communicates with the host memory 14, and controls the buffer 24 and link 26. The buffer memory 24 functions as a "cache" to provide temporary storage of information normally resident in host memory 14; that information may then be quickly accessed by the processor 22 without referencing the host memory 14. The link 26 typically comprises state devices and transceivers that physically connect the adapter to the interconnect medium 25. In addition, the link is typically responsible for implementing the lower levels of the interconnect medium protocol and moving information between the medium 25 and buffer memory 24.

Figure 3:
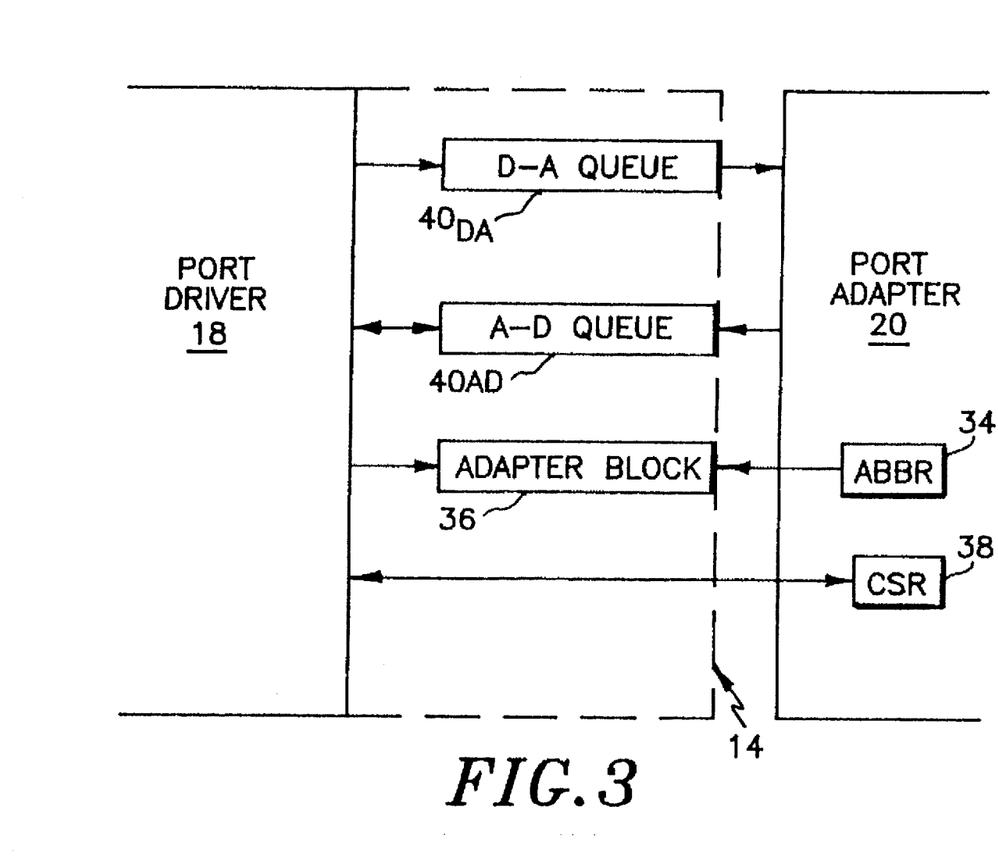
FIG. 3 (s an architectural diagram of a communication interface used to pass messages and responses between the port driver and port adapter.

FIG. 3 depicts a logical interface for exchanging information between the driver 18 and the port adapter 20. As can be seen, the interface may comprise various data structures in the host memory 14 and may include registers located in the port adapter 20. Specifically, the structures include: (i) at least one driver-adapter (D-A) queue $40_{DA}$ used by the port driver to pass messages to the adapter; (ii) at least one adapter-driver (A-D) queue $40_{AD}$ used by the adapter to pass responses to the port driver; (ii) an adapter block (ADAPTER BLOCK) 36 comprising a data structure used by the port adapter and port driver to locate all structures and containing D-A and A-D queue headers and other control information; (iv) an adapter block base register (ABBR) 34 comprising a register containing the host memory physical address of the adapter block 36; and (v) control/status registers (CSR) 38 used by the port driver to convey initialization and control information to the port adapter, and used by the adapter to convey interrupt and error status information to the port driver.

Portions of the adapter block 36 and queues are preferably resident in host memory 14, but they may be copied to the port adapter buffer memory 24 (FIG. 2). The addresses of the ABBR 34 and CSR registers 38 are preferably in the port adapter's I/O address space. In accordance with the invention, a dual addressing arrangement is provided whereby the elements of the D-A and A-D queues $40_{DA}$ and $40_{AD}$, respectively, are addressed virtually by the port driver 18 and physically by the port adapter 20.

Figure 4:
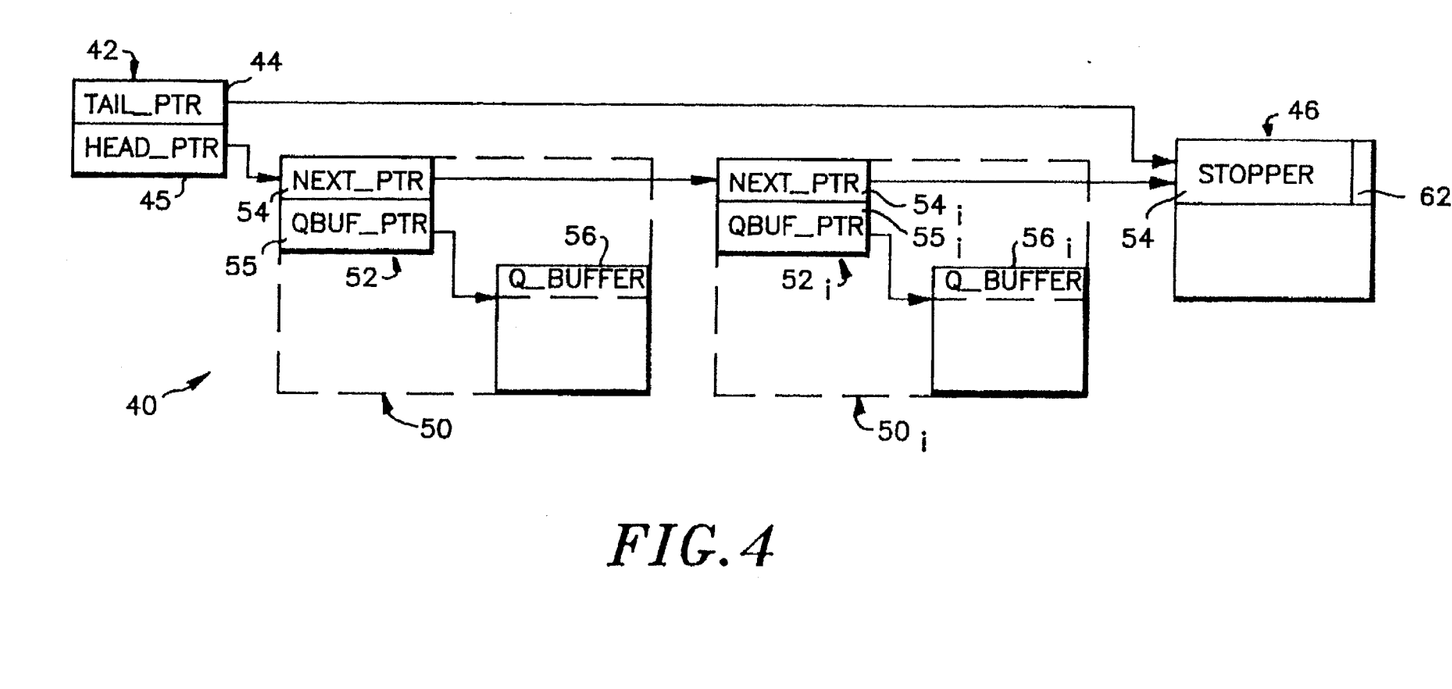
FIG. 4 is a diagram of a singly-linked queue in accordance with the invention.

Communication between the port driver 18 and port adapter 20 is primarily accomplished via a singly-linked queue used to exchange information between the driver and port adapter. FIG. 4 is a diagram of a singly-linked queue, designated generally at 40, that may be implemented as a D-A queue, an A-D queue or any other type of queue, such as an adapter-to-adapter (A-A) queue that is used by the port adapter 20 for internal message entry storage. In general, each queue 40 may comprise a queue header 42, message entries 50, 50i and a stopper entry 46. The . queue header 42 preferably contains a first pointer, TAIL_PTR 44, referencing the stopper located at the end of the queue and a second pointer, HEAD_PTR 45, referencing the first entry located at the beginning of the queue.

A message entry 50, 50i may comprise addressable storage locations in host memory 14 used to identify and organize information exchanged between the port driver and port adapter. Each message entry, generally designated 50, contains a carrier 52, 52i and may contain a queue buffer, Q_BUFFER, 56, 56i. Each carrier, generally designated 52, may comprise addressable storage locations in host memory 14 that provide a means for storing a forward link pointer, NEXT_PTR 54, which references the next entry 50i in the queue 40. Each Q_BUFFER, generally designated 56, may also comprise addressable storage locations in host memory 14 that store the control information relating to a specific message or response that is transferred between the port adapter and driver. In one embodiment, the Q_BUFFER may be integrated into the carrier structure; alternately, each carrier 52 may also contain an information pointer, QBUF_PTR 55, which points to the Q_BUFFER 56. In this alternate embodiment, the carrier and Q_BUFFER are separate structures to permit independent reuse; the carrier 52 thus provides a singly-linked structure that also links the information contained in the Q_BUFFER 56 into the queue 40.

The stopper entry 46 identifies the end of the queue 40. Functionally, the stopper 46 allows the port driver 18 and port adapter 20 to concurrently insert and remove message entries of the singly-linked queue 40 in a reliable manner without the use of any external synchronization mechanism, such as an interlock. This is possible, in part, because the stopper 46 is one entry beyond the last message entry 50i. The stopper 46 is required because the forward link pointers in each carrier 52 contain the address of the next entry in the queue. Thus, a stopper entry 46 is included on every queue 40, even if there are no message entries currently in the queue. In this latter case, the HEAD_PTR 45 and TAIL_PTR 44 have someplace to point, i.e., to the stopper entry 46, even when the queue is empty.

As will be described in detail herein, the dual addressing arrangement comprises a complex pointer structure for each of the NEXT_PTR 54 and the QBUF_PTR 55 within a carrier 52. The complex pointer may consist of a physical address portion and a corresponding "token" virtual address portion. The physical address portion identifies the location of a structure in host memory 14, i.e., physical address space, while the virtual address portion contains the address of that structure in the driver's virtual address space.

The token virtual address is initialized by the driver 18 to the virtual address of the carrier 52 when it is allocated, either during system initialization or dynamically thereafter. The driver then translates the virtual address to a physical address. Thereafter, both the physical and virtual addresses are stored as a complex pointer in the carrier 52 for use by the port adapter 20. As described below, the port adapter 20 uses the physical address to access other entry structures, such as a carrier 52 or a Q_BUFFER 56, in host memory 14. The token is then used by the adapter to construct a pointer to that structure when the port adapter "returns" the structure to the driver 18. The port adapter 20 has "read-only" access to the token, i.e., the adapter may copy, but never alter, the token.

Figure 5:
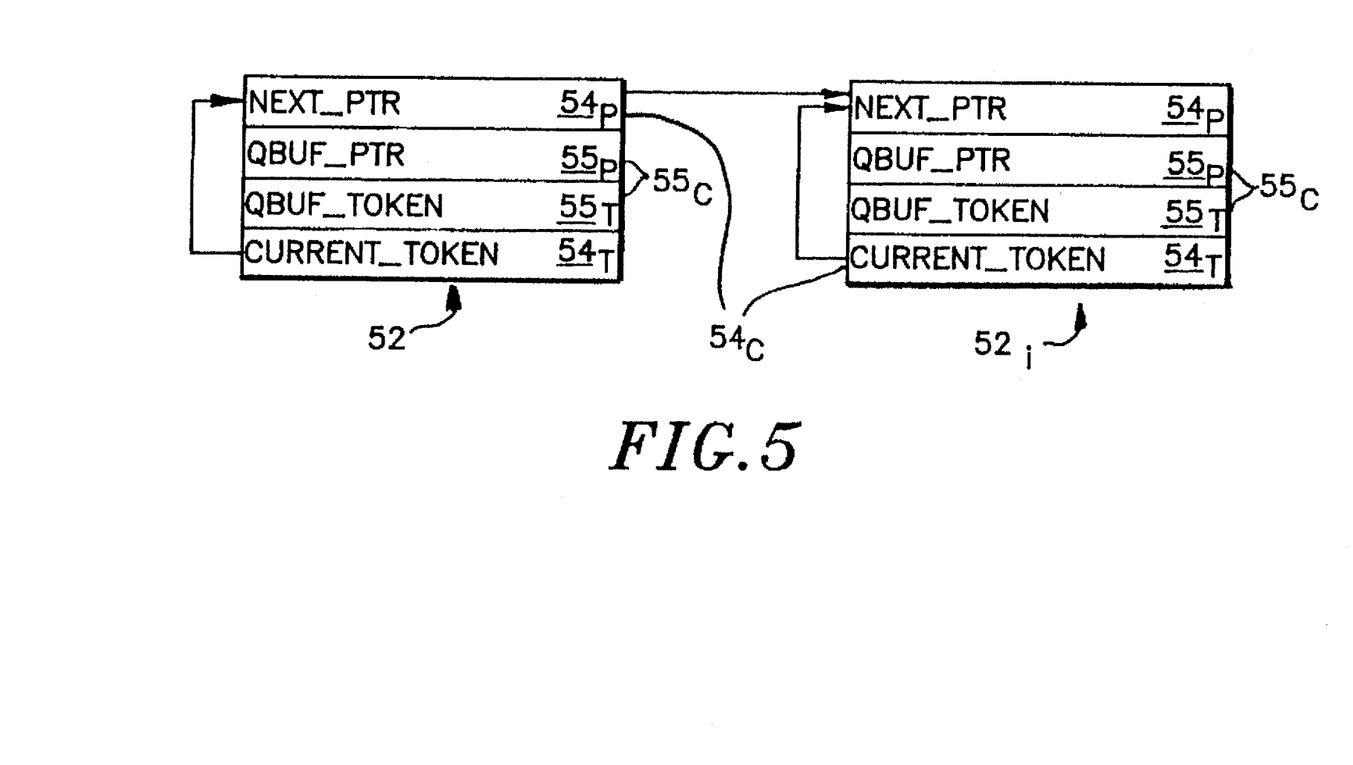
FIG. 5 depicts complex address pointer contents of a carrier in accordance with/the singly-linked queue of FIG. 4.

FIG. 5 depicts preferred complex address pointer contents of the carriers 52, 52i. In accordance with the invention, the carrier 52 contains a first complex pointer $55_C$ including addresses pointing to the queue buffer; i.e., QBUF_PTR $55_p$ and QBUF_TOKEN $55_T$. The carrier 52 also contains a first portion of a second complex pointer $54_C$ that includes an address pointing to the next entry (carrier 52i) in the queue, i.e., NEXT_PTR $54_p$. The second portion of that second complex pointer $54_C$ is located in the carrier 52i and includes an address pointing to the carrier 52i, i.e., CURRENT_TOKEN $54_T$. It should be noted that QBUF_PTR $55_p$ is an element of QBUF_PTR 55; similarly, the NEXT_PTR $54_p$ is an element of NEXT_PTR 54. In general when transferring a message from the port driver 18 to the port adapter 20, the driver 18 places physical addresses in the NEXT_PTR and QBUF_PTR fields $54_p$, $55_p$ of a carrier 52 for use by the port adapter to ascertain the location of an entry in host memory 14 containing the message. Similarly when transferring messages from the port adapter 20 to the port driver 18, the port adapter places virtual addresses in the NEXT_PTR and QBUF_PTR fields $54_p$, $55_p$ of a carrier 52 for use by the port driver to ascertain the location of an entry in host memory 14 containing the message.

Figure 6A:
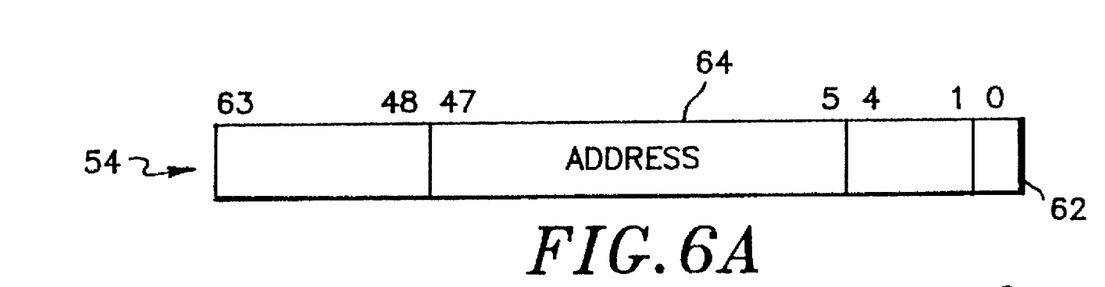
FIG. 6A depicts the various fields of a forward link pointer of the singly-linked queue of FIG. 4.

For example, the driver 18 inserts a message entry onto a D-A queue with the NEXT_PTR $54_p$ and QBUF_PTR $55_p$ of the carrier 52 containing physical addresses. FIG. 6A illustrates the contents of a carrier address pointer, such as NEXT_PTR $54_p$. The port adapter 20 "removes" the entry from the queue and uses the contents of the NEXT_PTR $54_p$ to locate the next entry. An example of the removal and insertion processes for a singly-linked queue is described in copending and commonly assigned U.S. patent application rifled, QUEUE APPARATUS AND MECHANICS FOR A COMMUNICATIONS INTERFACE ARCHITECTURE, of Lary et al., filed on even date herewith, and having Ser. No. 07/869,648 which application is expressly incorporated by reference as though fully set forth herein. Similarly, the contents of the QBUF_PTR $55_p$ are used by the port adapter to locate the message contained in a Q_BUFFER in host memory 14. The CURRENT_TOKEN $54_T$ and the QBUF_TOKEN $55_T$ of the message carrier 52 are virtual addresses used by the port adapter 20 to provide virtual address pointers to the entries for use by the driver 18. When responding to receipt of a message, the port adapter "moves" the pointers to the Q_BUFFER onto the the A-D queue $40_{AD}$ in reverse order. That is, the QBUF_PTR $55_p$ on the D-A queue $40_{DA}$ becomes the QBUF_TOKEN $55_T$ on the A-D queue $40_{AD}$, while the QBUF_TOKEN $55_T$ on the D-A queue becomes the QBUF_PTR $55_p$ on the A-D queue.

Referring again to FIGS. 3 and 4, each queue 40 is shared by the port adapter 20 and port driver 18; however, only one can remove entries from a queue; the other only inserts entries. Moreover, the remover and inserter can preferably access the queue 40 only at designated points, i.e., the inserter accesses only by means of the TAIL_PTR 44 and the remover accesses only by means of the HEAD_PTR 45. Specifically, the port adapter 20 is the remover for the D-A queue $40_{DA}$ and the inserter for the A-D queue $40_{AD}$. The port driver 18 is thus the inserter for the D-A queue $40_{DA}$ and the remover for the A-D queue $40_{AD}$. After initialization of the port adapter 20, the driver 18 and adapter may keep separate, designated copies of the queue header pointers 44 and 45. In other words, the port adapter 20 may "cache", i.e., maintain, the D-A queue HEAD_PTR and the A-D queue TAIL_PTR in its local buffer memory 24. The use of separate, designated pointers directly reduces the frequency of host memory references by the port adapter to update the TAIL_PTR, while also reducing possible CPU-adapter cache contention for a shared resource.

Figure 6B:
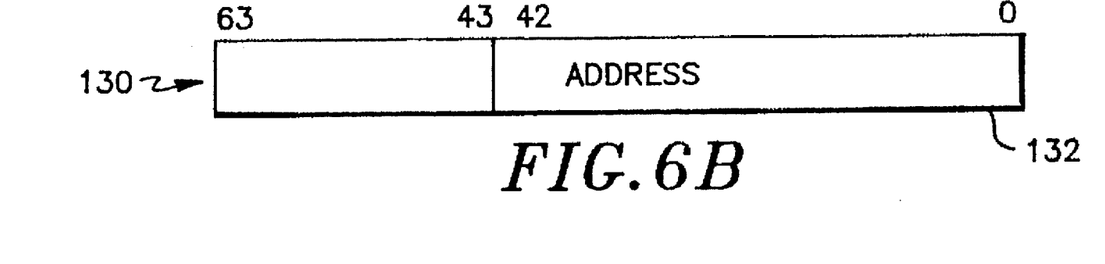
FIG. 6B depicts the format of the various fields of a control/status insertion register.
Figure 7:
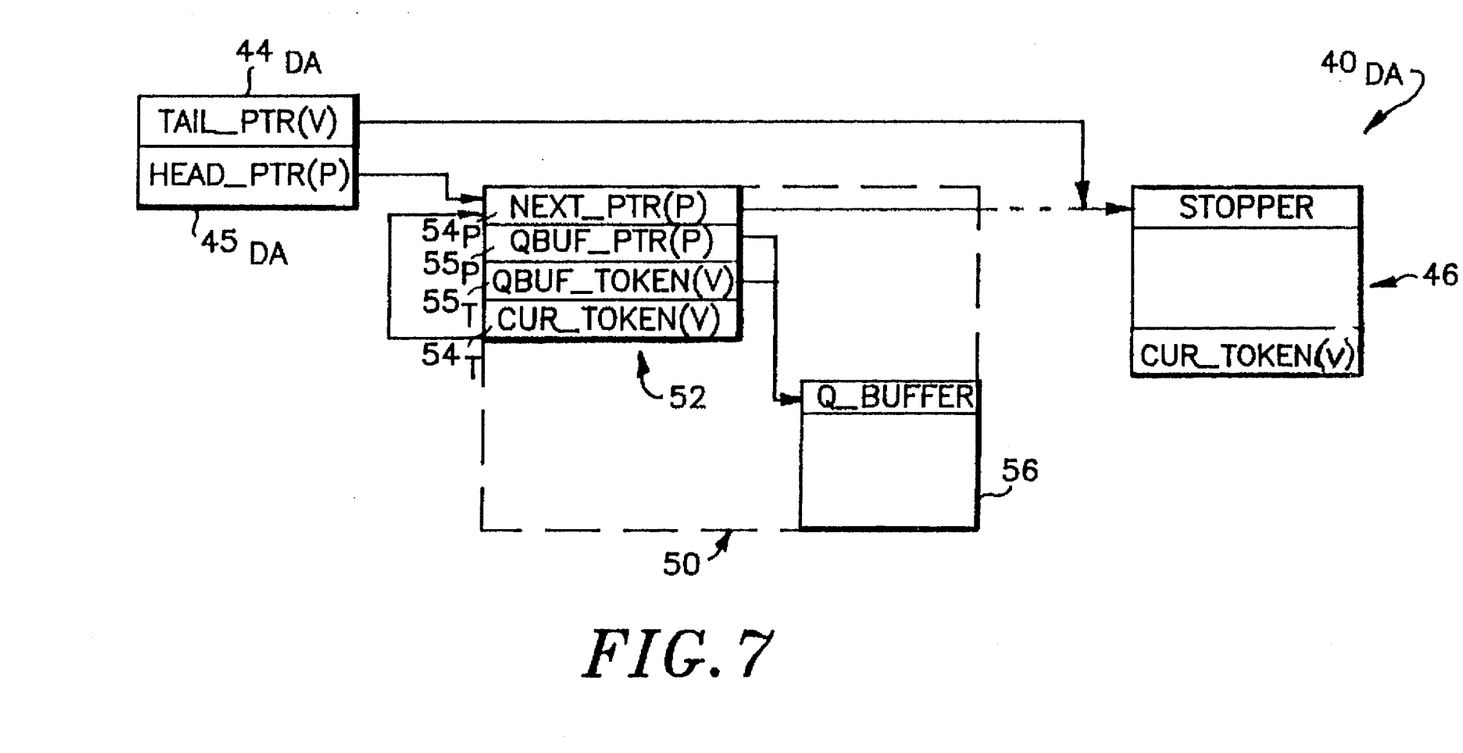
FIG. 7 depicts a first embodiment of the singly-linked queue including the complex address pointers of FIG. 6 arranged for dual addressing in accordance with the invention.

The arrangement and interpretation of the address portions of the complex pointer, e.g., whether the (_PTR) portion of the pointer is a physical address or a virtual address, within a carrier 52 depends upon the direction of information flow in a queue, i.e. a D-A queue or an A-D queue. FIG. 7 depicts the D-A queue $40_{DA}$ of FIG. 3 including the complex pointers of FIG. 5 arranged for dual addressing in accordance with the invention. An entry 50 is inserted by the driver 18 and eventually removed by the port adapter 20. Therefore, the HEAD_PTR $45_{DA}$ and all NEXT_PTRs $54_p$ are physical addresses; the TAIL_PTR $44_{DA}$ is a virtual address. In addition, the QBUF_PTR $55_p$ is a physical address pointer. The stored tokens, i.e., QBUF_TOKEN $55_T$ and CURRENT_TOKEN $54_T$, are virtual addresses for use by the port adapter when presenting the carrier 52 to the driver. In one embodiment, when the driver 18 inserts a message entry onto the queue $40_{DA}$, the port adapter 20 may be notified via an insertion register 130. FIG. 6B depicts the format of the various fields of the register 130, which is one of the CSRs 38 located in port adapter 20.

When the port adapter 20 removes an entry 50 from the D-A queue $40_{DA}$, the carrier pointers may be stored in the port adapter's buffer memory 24. Moreover, the NEXT_PTR $54_p$ and CURRENT_TOKEN $54_T$ pointers are separated from the QBUF_PTR $55_p$ and QBUF_TOKEN $55_T$ pointers. Separation of the pointers allows the Q_BUFFER 56 to be linked to a different carrier when returned to the driver.

Figure 8:
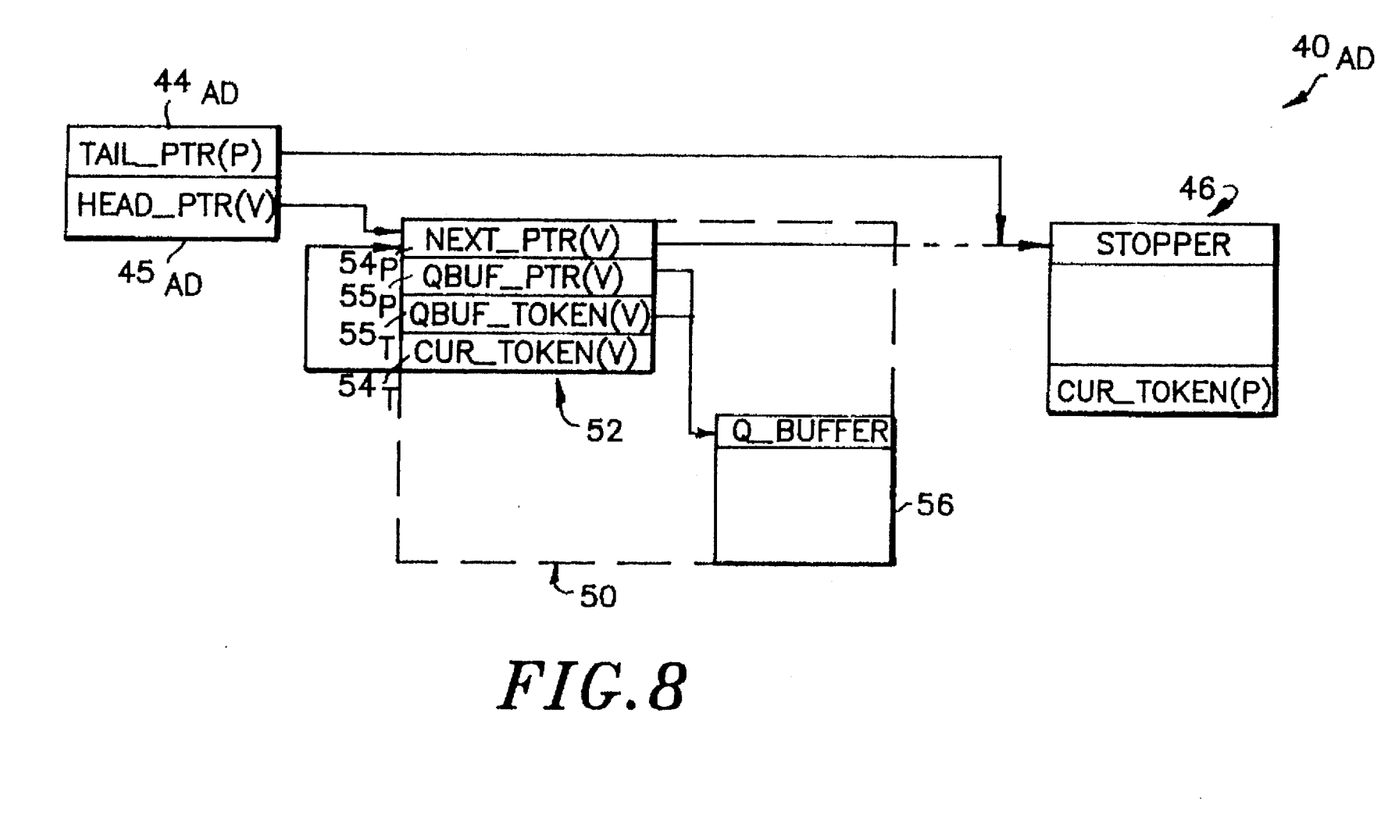
FIG. 8 depicts a second embodiment of the singly-linked queue including the complex address pointers of FIG. 6 arranged for dual addressing in accordance with the invention.

FIG. 8 depicts the A-D queue $40_{AD}$ of FIG. 3 including the complex pointers of FIG. 6 arranged for dual addressing in accordance with the invention. Here, an entry 50 is inserted by the port adapter 20 and later removed by the driver 18. Therefore, the HEAD_PTR $45_{AD}$ and all NEXT_PTRs $54_p$ are virtual addresses; the TAIL_PTR $44_{AD}$ is a physical address. In addition, the QBUF_PTR $55_p$ is a virtual address pointer. The stored tokens QBUF_TOKEN $55_T$ and CURRENT_TOKEN $54_T$ are virtual addresses used by the port adapter to construct the virtual pointers. That is, when inserting an entry 50 on the A-D queue $40_{AD}$ in response to a message received from the driver, the port adapter modifies the Q_BUFFER complex pointer addresses of the carrier 52. Specifically, the port adapter 20 alters the contents of the QBUF_PTR $55_p$ with the contents of the QBUF_TOKEN $55_T$ while they are stored in the adapter's buffer memory 24. The Q_BUFFER 56 may then be linked to a carrier on the A-D queue $40_{AD}$ that is different from that of the D-A queue $40_{DA}$, i.e., the port adapter copies the pointers via a write operation into the appropriate response entry location in host memory 14.

In accordance with the invention, the port adapter preferably does not perform virtual-to-physical address translations in order to manipulate the singly-linked queue. Furthermore, after initialization of the _PTR and _TOKEN address fields, neither the driver nor the adapter need translate addresses since the address of an exchanged entry is presented in a form most convenient for the parties. In contrast to the invention, previously known addressing techniques typically employed virtual addresses to access the queues. Accordingly, either the port adapter was forced to access the system page table directly to independently translate each address or the driver was forced to translate each address for the port adapter, which resulted in an increase in processing time and overhead.

The dual addressing arrangement of the invention obviates the port adapter's participation in the memory management process, thus alleviating software/firmware compatibility problems when changing the page size, address size or software page table organization of the host computer. Also, the number of host memory accesses by the port adapter is reduced; the adapter is not required to perform read operations of address translation information in host memory. Elimination of those read operations reduces the time required to process a message because the operations tend to be serial, i.e., the port adapter must follow a series of pointers. Moreover, the port driver need not perform time-consuming reverse, i.e., physical-to-virtual, address translation; once a carrier is allocated and initialized, no further translation is required. As a result, the invention affords substantially improved message processing performance by reducing the port driver (software) and port adapter processing overhead service time.

The foregoing description has been directed to specific embodiments of this invention. It will be apparent, however, that variations and modifications may be made to the described embodiments, with the attainment of some or all of its advantages. Therefore, it is the object of the appended claims to cover all such variations and modifications as come within the true spirit and scope of the invention.

What is claimed is:

1. A memory for storing data to facilitate exchanging information between a central processing unit and a port adapter, comprising:
   a data structure stored in said memory, said data structure including a complex address pointer to facilitate access to other data structures by said central processing unit and said port adapter, said complex address pointer including:
      a first virtual address portion used by said central processing unit to determine the location of one of said other data structures in said memory, said one of said other data structures including said information;
      a second virtual address portion used by said central processing unit to determine a location of a next entry in said data structure;
      a first physical address portion used by said port adapter to determine the location of said one of said other data structures in said memory; and
      a second physical address portion used by said port adapter to determine said location of said next entry in said data structure, said virtual address portions and said physical address portions being stored in said data structure using a first arrangement for passing said information in a first direction from said central processing unit to said port adapter and said virtual address portions and said physical address portions being stored in said data structure using a second different arrangement for passing said information in a second direction from said port adapter to said central processing unit.

2. The apparatus of claim 1 wherein said central processing unit is executing a port driver operating system program, said central processing unit performing data operations using said other data structures stored in said memory, and said port driver operating system program communicates with said port adapter using said first arrangement presenting said physical address portions to said port adapter.

3. The apparatus of claim 1 wherein said central processing unit is executing a port driver, said central processing unit performing data operations using said other data structures stored in said memory, and said port adapter communicates with said port driver using said second arrangement presenting said virtual address portions to said port driver.

4. In a host computer including a central processing unit, a host memory and a port adapter, a dual addressing arrangement for locating entries of a singly-linked queue in said host memory, said singly-linked queue configured to pass information between said port adapter and a port driver operating system program executed by said central processing unit, said dual addressing arrangement comprising:
   queue buffer means for storing said information for passing between said port adapter and said driver;
   carrier means for storing first and second complex address pointers, said first complex address pointer configured to point to said queue buffer means and comprising:
      a first address portion used to determine the location of said queue buffer means in said host memory; and
      a second address portion used to determine the location of said queue buffer means in said host memory;
   said second complex address pointer configured to point to a next entry in said singly-linked queue and said carrier means of said next entry, said second complex address pointer comprising:
      a third address portion used to determine the location of said next entry in said host memory;
      a fourth address portion used to determine the location of said next entry in said host memory;
   said first and third address portions being physical address pointers and said second and fourth address portions being virtual address pointers used by said port adapter and said port driver respectively when passing said information from said port driver to said port adapter via said singly-linked queue, and said first and third address portions being virtual address pointers and said second and fourth address portions being physical address portions used by said port adapter and said port driver respectively when passing said information from said port adapter to said port driver via said singly-linked queue.

5. The apparatus of claim 4 wherein said carrier means comprises a carrier having addressable storage locations in said host memory, said carrier contained within each of said entries of said singly-linked queue.

6. The apparatus of claim 5 wherein said queue buffer means comprises a queue buffer having addressable storage locations in said host memory.

7. In a host computer including a central processing unit, a host memory and a port adapter, a method for locating entries of a singly-linked queue including a stopper entry in said host memory, said singly-linked queue configured to pass information between said port adapter and a port driver, said method comprising the steps of:

storing in a queue buffer said information for passing between said port adapter and said port driver;

storing in a first carrier a first complex address pointer configured to point to said queue buffer means, said first complex address pointer comprising a first address portion used to determine the location of said queue buffer means in said host memory and a second address portion used to determine the location of said queue buffer means in said host memory; and storing in said first carrier a first portion of a second complex address pointer configured to point to a next entry in said singly-linked queue and storing in a second carrier a second portion of said second complex address pointer configured to point to said second carrier, said second complex address pointer comprising a third address portion used to determine the location of said next entry in said host memory and a fourth address portion used to determine the location of said next entry in said host memory, wherein said first and third address portions are physical address pointers and said second and fourth address portions are virtual address pointers used by said port adapter and said port driver respectively when passing said information from said port driver to said port adapter via said singly-linked queue and wherein said first and third address portions are virtual address pointers and said second and fourth address portions are physical address portions used by said port adapter and said port driver respectively when passing said information from said port adapter to said port driver via said singly-linked queue.

* * * * *